United States Patent [19]

Tarui et al.

[11] Patent Number: 5,417,247
[45] Date of Patent: May 23, 1995

[54] BLEED SCREW CAP FOR HYDRAULIC EQUIPMENT

[75] Inventors: Ken Tarui; Shinji Aoyagi, both of Saitama, Japan

[73] Assignee: Akebono Brake Industry Co., Ltd., Tokyo, Japan

[21] Appl. No.: 200,533

[22] Filed: Feb. 22, 1994

Related U.S. Application Data

[63] Continuation of Ser. No. 928,178, Aug. 14, 1992, abandoned, which is a continuation of Ser. No. 645,832, Jan. 25, 1991, abandoned.

[30] Foreign Application Priority Data

Jan. 26, 1990 [JP] Japan .................................. 2-5664

[51] Int. Cl.⁶ ............................................. F16L 55/10
[52] U.S. Cl. ........................... 138/89.2; 138/89.4; 137/381; 137/382; 184/88.2
[58] Field of Search .................. 138/89.1, 89.2, 89.3, 138/89.4; 137/377, 379, 381, 382; 152/427, 428, 429, DIG. 13; 215/26, 27, 28, 29; 188/352; 184/88.1, 88.2, 89

[56] References Cited

U.S. PATENT DOCUMENTS

| | | | |
|---|---|---|---|
| 1,512,662 | 10/1924 | Atkinson | 152/428 |
| 1,604,442 | 10/1926 | Zerk | 184/88.1 |
| 2,044,837 | 6/1936 | Davis | 138/89.3 |
| 2,530,888 | 11/1950 | Marchelewicz | 184/88.2 |
| 2,599,472 | 6/1952 | Miller | 184/88.2 |
| 2,963,046 | 12/1960 | Goodrich | 138/89.2 |
| 3,147,824 | 9/1964 | Henderson | 184/88.1 |
| 3,332,515 | 7/1967 | Borah | 138/89.3 |
| 4,164,241 | 8/1979 | Kubo | 137/377 |
| 4,253,488 | 3/1981 | Leverberg | 137/382 |
| 4,307,748 | 12/1981 | Mathias | 137/381 |
| 4,445,530 | 5/1984 | Meixell | 137/381 |
| 4,530,421 | 7/1985 | Balch | 184/88.2 |

FOREIGN PATENT DOCUMENTS

| | | | |
|---|---|---|---|
| 0219895 | 9/1958 | Australia | 184/88.1 |
| 2268209 | 11/1975 | France . | |
| 0093196 | 4/1990 | Japan | 184/88.2 |
| 1556618 | 11/1979 | United Kingdom . | |
| 2031858 | 4/1980 | United Kingdom . | |
| 2044402 | 10/1980 | United Kingdom | 188/352 |
| 2091822 | 8/1982 | United Kingdom . | |

*Primary Examiner*—David A. Scherbel
*Assistant Examiner*—Tony G. Soohoo
*Attorney, Agent, or Firm*—Cushman, Darby & Cushman

[57] ABSTRACT

A bleed screw cap for hydraulic equipment including a holding ring made of an elastic material which has high axial compressibility, an elastic cap, a cylindrical shaped skirt portion attached to the elastic cap, and a seal member attached to the skirt portion so as to cover an upper surface of the holding ring.

13 Claims, 1 Drawing Sheet

BLEED SCREW CAP FOR HYDRAULIC EQUIPMENT

This is a continuation of application Ser. No. 07/928,178, filed on Aug. 14, 1992, which was abandoned upon the filing hereof which is a continuation of application Ser. No. 07/645,832, filed Jan. 25, 1991, abandoned.

BACKGROUND OF THE INVENTION

The present invention relates to a bleed screw cap hydraulic equipment, for example, an air bleed screw provided with a cylinder portion of such as a caliper member in a disc brake, and more particularly to an elastic cap for protecting a plug which is provided for exhausting air contained in the cylinder. Such a bleed screw cap is efficiently utilized for preventing rust, corrosion and fouling of the whole bleed screw.

With respect to a disc brake in a vehicle, when air remains within the cylinder of the caliper member, braking operation is reduced. For this reason, the air bleed screw is provided with the cylinder of the caliper member whereby air contained within the cylinder can be exhausted. Often, the air bleed screw becomes contaminated by mud and dust and the like during driving so that the exhaust hole becomes clogged. The present invention overcomes these deficiencies.

The conventional air bleed screw cap will now be described in detail with reference to FIG. 1.

As shown in FIG. 1, boss 1 protrudes from cylinder C. A needle valve 2 is screwed to the boss 1. A conical portion 4 formed on the end of the valve 2 is pushed against a valve seat 3 in the lower end of the screw hole of the boss 1 so that an exhaust port P of the cylinder is closed. An exhaust tube extends through the needle valve 2 from an exhaust hole 5 to a conical head 8. The exhaust hole 5 is in the minor diameter portion 6 of the lower end of the valve 2.

The needle valve 2 has a hexagonal portion 7, the conical shaped head 8, and a neck portion 9. When the hexagonal portion 7 is loosened with a wrench, the needle valve 2 is loosened and the conical portion 4 is separated from the valve seat 3. The exhaust hole 5 of the needle valve 2 is thus in communication with the exhaust port P of the cylinder C so that air contained within the cylinder C is exhausted.

An elastic cap 10 is fitted on the head 8 of the needle valve stem portion 2 so that an exhaust port 8' of the exhaust tube is protected from contamination by dust, mud, and water. The elastic cap 10, a holding ring 12, and a flexible connecting piece 11 are connected integrally with each other to prevent the elastic cap from becoming separated and lost. Additionally, the holding ring 12 is fixedly secured to the hexagonal portion 7.

As described above, the conventional air bleed screw cap is provided to cover the head 8 of the needle valve stem portion 2, and to protect the head 8 and prevent the exhaust port 8' from clogging. However, the conventional needle valve 2 thus constructed suffers from the following problem. During use, rain water or mud water flows into the engaging portion between the needle valve 2 and the screw hole of the boss 1 resulting in rust, corrosion and contamination, and the hexagonal portion 7 becomes corroded and damaged.

SUMMARY OF THE INVENTION

With the above deficiencies of the prior art in view, it is an object of this invention to provide an air bleed screw cap which covers and seals completely an engaging portion between a needle valve and a cylinder boss of the needle valve in order to enhance durability of the needle valve.

The above object can be achieved by providing an air bleed screw cap for hydraulic equipment which, according to the invention, comprises: a holding ring made of an elastic material which has high axial compressibility; an elastic cap; a cylindrical shaped skirt portion provided to the elastic cap; and a seal member provided to the skirt portion for covering the upper surface of the holding ring.

According to the present invention, when the hexagonal portion of the needle valve is strongly fastened so as to close the needle valve, the holding ring is pushed between the under surface of the hexagonal portion and the upper surface of the boss. In this condition, since the axial compressibility of the holding ring is high, the needle valve can be further closed after the under surface of the hexagonal portion contacts the upper surface of the holding ring. Therefore, the conical portion of the under end of the needle valve is strongly pushed against the valve seat so that the valve is surely closed. In addition, the under surface of the holding ring is strongly pushed against the upper surface of the boss of the cylinder so that rain water, mud water and so on are surely prevented from flowing into the engaging portion between the needle valve and the cylinder boss.

When the elastic cap is fitted to the head of the needle valve, the skirt portion of the elastic cap covers the hexagonal portion and the seal lip attached to the skirt contacts the upper edge of the holding ring so that rain water, mud water and so on are prevented from flowing into the engaging portion between the needle valve and the cylinder boss.

Therefore, the engaging portion between the head of the needle valve or the hexagonal portion and the boss of the cylinder are completely covered and sealed by the elastic cap and the holding ring.

DETAILED DESCRIPTION OF THE PREFERRED EMBODIMENT

A preferred embodiment of an air bleed screw cap of the present invention will now be described in detail with reference to FIGS. 2 and 3.

Figure 1:
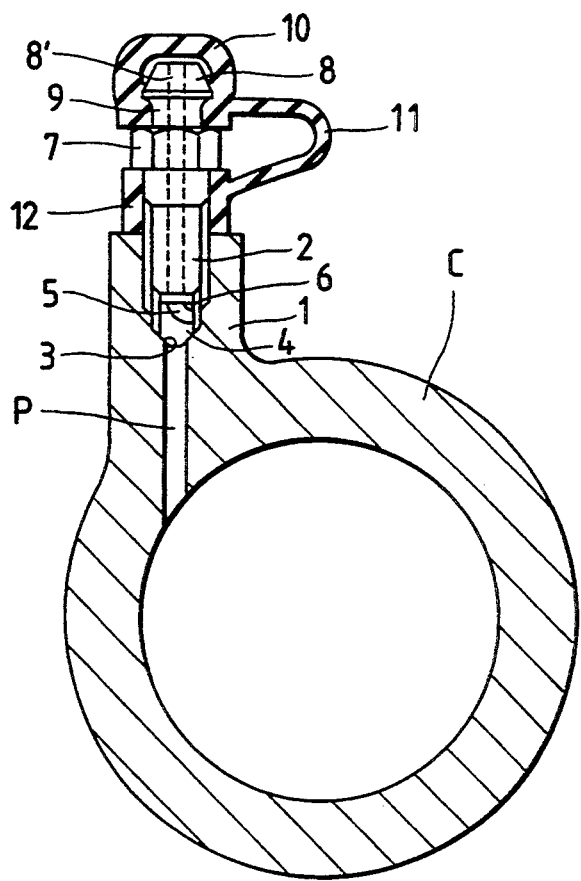
FIG. 1 is a cross-sectional view of a conventional bleed screw cap.
Figure 2:
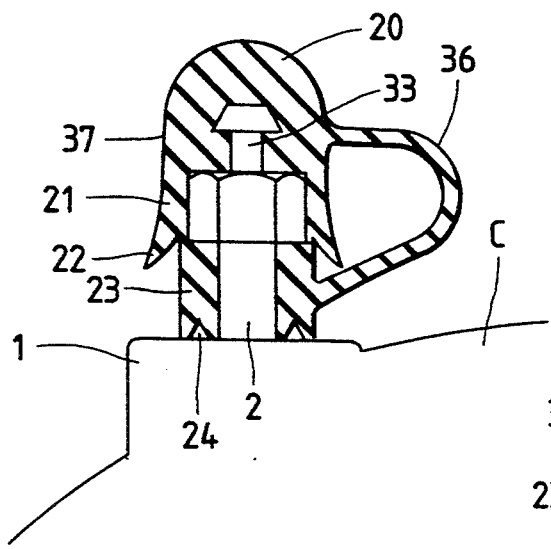
FIG. 2 is a cross-sectional view of a bleed screw cap according to an embodiment of the present invention.
Figure 3:
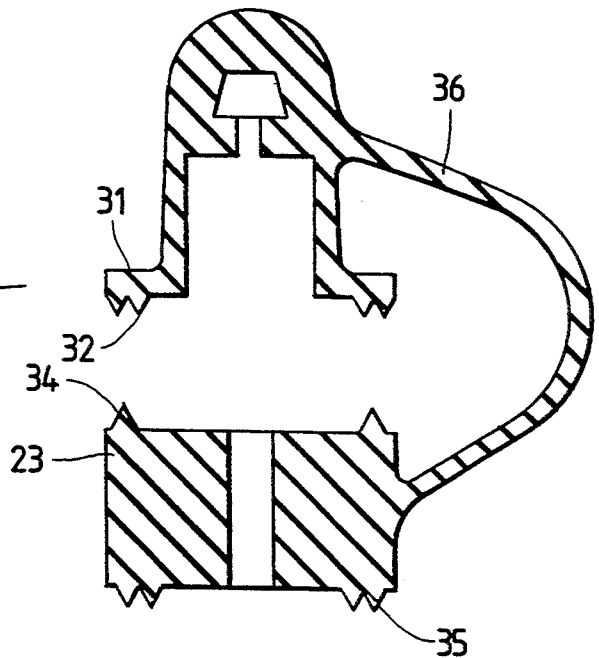
FIG. 3 is a cross-sectional view of a bleed screw cap according to an another embodiment of the present invention.

As shown in FIGS. 2 and 3, a cylindrical shaped skirt portion 21 protrudes downwardly from a bottom portion 37 of an elastic cap 20. The end of the skirt portion 21 is elongated outwardly to be shaped like a cone so that a seal lip 22 is formed. The length of a holding ring 23 is provided to be longer than the space between the under surface of a major diameter step portion 40 or a hexagonal portion 33 and an upper surface of a boss 1 of a cylinder C in the case where a valve is closed. In addition, an inverted V-shaped annular groove 24 is provided in the under surface of the holding ring 23 in order to enhance compressibility of the holding ring 23 in the axial direction and to provide a double seal between the holding ring and the cylinder boss. Therefore, when the hexagonal portion 33 is rotated by a wrench and the needle valve is closed, the under end of the holding ring 23 is elastically transformed in the axial direction and strongly pressed against the upper surface of the boss 1 by the elastic force.

When an elastic cap 20 is fitted to the head 8 of the needle valve stem portion 2, the hexagonal portion 33 is covered with the skirt portion 21 and the seal lip 22 attached to the skirt portion 21 is pressed to contact the upper surface of the holding ring 23.

In the case where the holding ring 23 is made of highly elastic material, since the resisting power for compressing the holding ring in the axial direction becomes small, there is no need to provide the annular groove 24. In addition, since the lower end of the skirt portion 21 is elongated outwardly to form a cone, the skirt portion 21 covers and is pressed against the upper surface of the holding ring 23. Therefore it is not necessary that the thickness of the lower end of the skirt portion 23 be particularly small. In short, when closing the needle valve, it is desired that the holding ring 23 does not interfere with the closing operation of the valve but is strongly pressed against the upper surface of the boss 1 to form a tight seal. In addition, when the cap 20 is fitted on the head 8, it is also desired that the end of the skirt portion 21 is pressed against the holding ring 23 so that the contact surface therebetween is surely sealed.

If above condition is fulfilled, any shape and any structure of the seal lip on the skirt portion and the holding ring may be provided.

FIG. 3 shows an another embodiment of the present invention. In this embodiment, an annular flange 31 is provided on the end of the skirt portion and V-shaped annular seal lips 32 are provided on the under surface of the flange 31. In this case, an annular seal lip 34 on the top surface of the holding ring 23 engages the annular flange between annular lips 32 thus forming a more secure seal between the cap and the holding ring.

The second embodiment also includes an annular seal lip 35 on the lower surface of the holding ring. Since the difference in length of the needle valve between the open and closed position is small, if the annular seal lip is within 2-3 mm high axial compressibility of the holding ring 23 is ensured by compression in the axial direction of the annular seal lip.

Further, the cap 23 and the holding ring 20 are connected integrally with the flexible piece 11 so that the cap will not become separated and lost.

As described above, the present invention eliminates the difficulties inherent with the conventional air bleed screw cap. The present invention provides a bleed screw which prevents corrosion and has a higher durability than those of prior art.

Therefore, the present invention, achieves excellent advantages over the conventional structure by completely sealing the engaging portion between the needle valve and the boss.

What is claimed is:

1. A bleed screw cap for a hydraulic equipment bleed screw having a major diameter step portion and a stem portion, comprising:

a holding ring made of a compressible elastic material, said holding ring having: (1) a lower end surface which sealingly contacts a main body of the hydraulic equipment, and (2) an upper end surface having (a) an outer portion including at least one sealing surface, and (b) an inner portion which sealingly contacts the major diameter step portion, thereby forming a first seal;

an elastic cap having a bottom portion, said bottom portion having a skirt portion, said skirt portion having at least one sealing surface, wherein said elastic cap can be placed into sealing contact with said bleed screw and holding ring by placing said at least one sealing surface of said skirt portion into sealing contact with said at least one surface of the outer portion of the upper end surface of said holding ring, thereby forming a second seal;

wherein the entire bleed screw is isolated from invading liquids and solid particles when said first and second seal are formed by said holding ring and elastic cap.

2. A bleed screw cap according to claim 1, further comprising a flexible member connecting said holding ring with said elastic cap for preventing said elastic cap from becoming separated and lost.

3. A bleed screw cap according to claim 1, wherein said seal at least one sealing surface is a lip.

4. A bleed screw cap according to claim 1, wherein said at least one sealing surface is an annular flange.

5. A bleed screw cap according to claim 4, wherein first annular seal lips are provided to an under surface of said annular flange and a second annular seal lip is provided to the upper surface of said holding ring so as to be engaged with said first annular seal lips.

6. A bleed screw cap according to claim 4, wherein annular seal lips are provided to the lower surface of said holding ring.

7. A bleed screw cap for a hydraulic equipment bleed screw having a major diameter step portion and a stem portion, comprising:

a holding ring disposed between a main body of said hydraulic equipment and said major diameter step portion, wherein said holding ring is made of an axially compressible elastic material and includes a lower end surface and an upper end surface, said upper end surface being comprised of an inner portion and an outer portion, said outer portion including at least one sealing surface;

wherein an umcompressed axial length of said holding ring is greater than a distance between said main body and said major diameter step portion, thereby creating a compression force in said holding ring in an axial direction when disposed between said main body and said major diameter step portion, said compression force causes said lower end surface of said holding ring to sealingly contact the main body of said hydraulic equipment and said inner portion of said upper end surface of said holding ring to sealingly contact said major diameter step portion, thereby forming a first seal;

an elastic cap having a bottom portion, said bottom portion having a skirt portion including at least one sealing surface, said elastic cap being disposed into sealing contact with said bleed screw and holding ring by placing the at least one sealing surface of said skirt portion into forceful contact with said at least one sealing surface of the outer portion of the upper end surface of said holding ring, thereby forming a second seal;

wherein when said first and second seals are formed by said holding ring and elastic cap, the entire bleed screw is isolated from atmospheric contaminants including invading liquids and solid particles.

8. A bleed screw cap according to claim 7, wherein an annular groove is provided on said lower end surface of said holding ring so as to enhance said compression force in said axial direction.

9. A bleed screw cap according to claim 7, further comprising a flexible member connecting said holding ring with said elastic cap, thereby preventing said elastic cap from becoming separated and lost.

10. A bleed screw cap according to claim 7, wherein said at least one sealing surface is a seal lip.

11. A bleed screw cap according to claim 7, wherein said at least one sealing surface is an annular flange.

12. A bleed screw cap according to claim 11, wherein first annular seal lips ar provided to an under surface of said annular flange and a second annular seal lip is provided to the upper surface of said holding ring so as to engage with said first annular seal lip.

13. A bleed screw cap according to claim 11, wherein annular seal lips are provided to the lower surface of said holding ring.

* * * * *